United States Patent [19]

Tillman et al.

[11] 4,055,757

[45] Oct. 25, 1977

[54] CALCULATOR APPARATUS WITH ANNUITY SWITCH FOR PERFORMING BEGIN-AND END-PERIOD ANNUITY CALCULATIONS

[75] Inventors: Lynn W. Tillman, Los Altos; Kent R. Henscheid, Sunnyvale, both of Calif.; Larry D. Smith, Damascus, Md.

[73] Assignee: Hewlett-Packard Company, Palo Alto, Calif.

[21] Appl. No.: 718,290

[22] Filed: Aug. 27, 1976

[51] Int. Cl.² .............................................. G06F 15/30
[52] U.S. Cl. ..................................... 364/715; 364/408
[58] Field of Search .............................. 235/152, 156; 340/172.5

[56] References Cited

U.S. PATENT DOCUMENTS 3,760,171 9/1973 Wang et al. .................. 340/172.5 X
3,863,060 1/1975 Rode et al. ........................... 235/156
3,892,958 7/1975 Tung .................................... 235/156
3,946,218 3/1976 Rode et al. ........................... 235/156
3,978,328 8/1976 Fabry et al. .......................... 235/156

*Primary Examiner*—Jerry Smith
*Attorney, Agent, or Firm*—Robert S. Hulse

[57] ABSTRACT

A programmable electronic calculator is provided having a manually operable annuity switch with begin- and end-position settings, enabling a user to specify the type of annuity calculation to be performed. When the switch is set to the begin position, the annuity calculation is performed with payments due at the beginning of each payment period; when the switch is set to the end position, the annuity calculation is performed with payments due at the end of each payment period. The annuity calculation is performed under control of a routine stored in a read-only-memory (ROM) of a data processing unit.

4 Claims, 4 Drawing Figures

CALCULATOR APPARATUS WITH ANNUITY SWITCH FOR PERFORMING BEGIN-AND END-PERIOD ANNUITY CALCULATIONS

BACKGROUND OF THE INVENTION

Many known electronic calculators typically perform annuity calculations as if payments were due to be made at the end of each payment period. For example, such calculators typically perform future value (FV) and present value (PV) annuity calculations according to the following equations:

$$FV = PMT \frac{(1+i)^n - 1}{i} \quad (1)$$

$$PV = PMT \frac{(1+i)^n - 1}{i(1+i)^n} \quad (2)$$

where,

PMT represents payment due at the end of each payment period, i represents interest rate per compounding period, and n represents the number of compounding periods.

For certain types of transactions (e.g., loans, savings) where payments are due at the end of each payment period, such "end type" annuity calculations are proper. However, for other types of transactions (e.g., leases, insurance) where payments are typically due at the beginning of each payment period, such "end type" annuity calculations would be improper.

A prior-art electronic calculator of the type for performing annuity calculations with payments due at the end of each payment period is described, for example, in U.S. Pat. No. 3,863,060 entitled "General Purpose Calculator with Capacity for Performing Interdisciplinary Business Calculations", issued to Francé Rodé, et al., Jan. 28, 1975. The above equations are shown in lines 61 and 62 of column 69 of said patent.

To utilize such a prior-art calculator for performing calculations when payments are due at the beginning of each payment period, it is often necessary for a user to manually substitute one value for another in the equation defining the calculation. For example, to calculate FV when payments are due at the beginning of each payment period, the user must manually substitute "PMT (1 + i)" for "PMT" in equation (1) above, prior to making the calculation. Likewise, to determine the values of other variables such as n, i, PMT or PV when payment is to be made at the beginning of each period rather than at the end of each period, the user must repeatedly perform the manual substitutions shown in Table 1 below each time such a determination is to be made.

TABLE 1

| SUBSTITUTION NECESSARY | WHEN SOLVING FOR | IN TERMS OF |
| --- | --- | --- |
| PMT (1 + i) for PMT | n | (i, PMT, FV) or (i, PMT, PV) |
| (n − 1) for n, and (PV − PMT) for PV | i | n, PMT, PV |
| (n + 1) for n, and (FV + PMT) for FV | i | n, PMT, FV |
| $\frac{PV}{(1+i)}$ for PV | PMT | n, i, PV |
| $\frac{FV}{(1+i)}$ for FV | PMT | n, i, FV |
| PMT (1 + i) for PMT | PV | n, i, PMT |

To alleviate the inconvenience of repeated manual substitutions and the increased likelihood of user (operator) error that may be occasioned thereby, an electronic calculator is needed that is capable of performing annuity calculations automatically, i.e., without the need for manual entry of substituted data by an operator, when payments are due at the beginning of the payment period.

SUMMARY OF THE INVENTION

Thus, in accordance with the illustrated preferred embodiment of the present invention, there is provided an electronic calculator including an Annuity Switch that is settable to a begin or end position, and a Begin-End Calculation Logic, said logic comprising data storage registers, an arithmetic unit or adder, a read-only-memory (ROM) and a routine stored in the ROM for preprocessing selected data stored in the registers according to the position of the annuity switch. When the annuity switch is set to the "begin" position, selected data entered into one or more of the data storage registers are preprocessed (substituted-for) and converted to a form suitable for use in annuity calculations where payments are due at the beginning of each payment period.

DESCRIPTION OF THE PREFERRED EMBODIMENT

Figure 1:
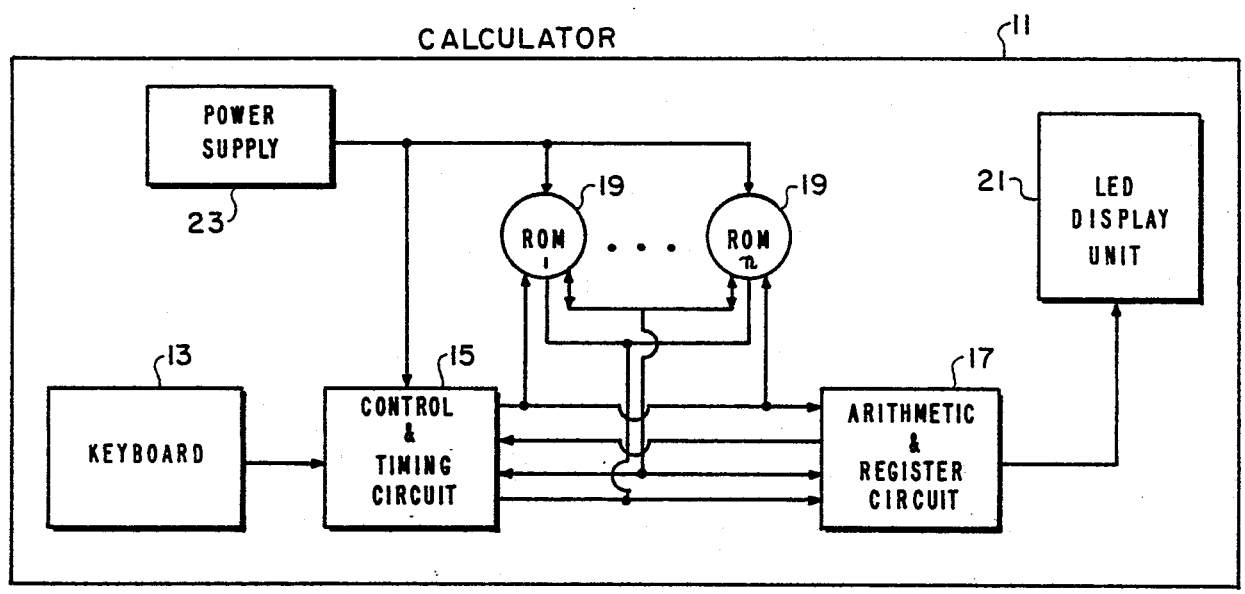
FIG. 1 is a block diagram of a conventional electronic calculator.

Referring to FIG. 1, there is shown a conventional electronic calculator 11, including a keyboard input unit 13, a control and timing circuit 15, an arithmetic and register circuit 17, at least one read-only-memory (ROM) 19, an LED output display unit 21, and a power supply 23. This calculator and the aforementioned elements thereof may be constructed and operated in the same manner shown and described in detail in above-referenced U.S. Pat. No. 3,863,060 and incorporated by reference herein (see, for example, FIGS. 2 and 10 and the associated descriptions thereof in the referenced patent).

Figure 2:
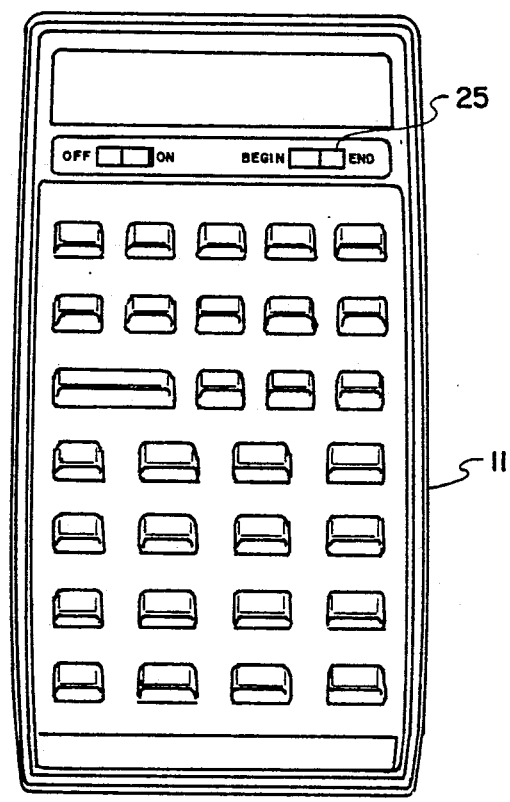
FIG. 2 is a top view of the calculator of FIG. 1 including a begin-end annuity switch in accordance with the preferred embodiment of the present invention.
Figure 3:
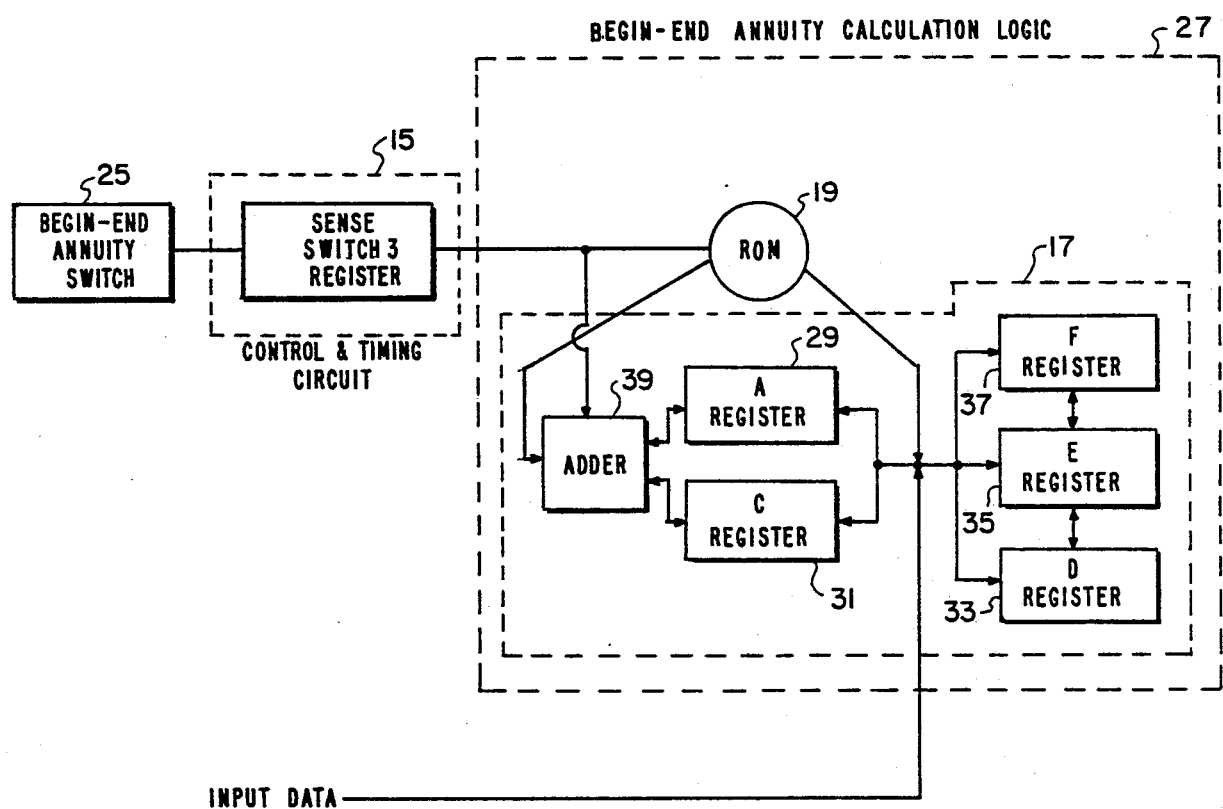
FIG. 3 is a block diagram of a begin-end annuity calculation logic employed in the calculator of FIG. 2 in accordance with the preferred embodiment of the present invention.

Referring now to FIGS. 2 and 3 herein, there is shown a Begin-End Annuity Switch 25 and a Begin-End Annuity Calculation Logic 27 employed in the calculator 11 of FIG. 1 in accordance with the preferred embodiment of this invention. The switch 25 and begin-end annuity calculation logic 27 (hereinafter "begin-end logic") enables the calculator 11 to perform "begin and end" type annuity calculations without the need for manual substitution of input data values by an operator. The begin-end logic 27 includes registers A, C, D, E and F 29-37 of the arithmetic and register circuit 17, and also adder 39 of said circuit 17. The begin-end logic 27 also includes a data substitution routine stored in ROM 19. In response to switch 25 being set to the "begin" position, the begin-end logic, under control of the stored routine performs data substitution and transfers control to a routine which performs the annuity calculation upon the substituted data.

Figure 4:
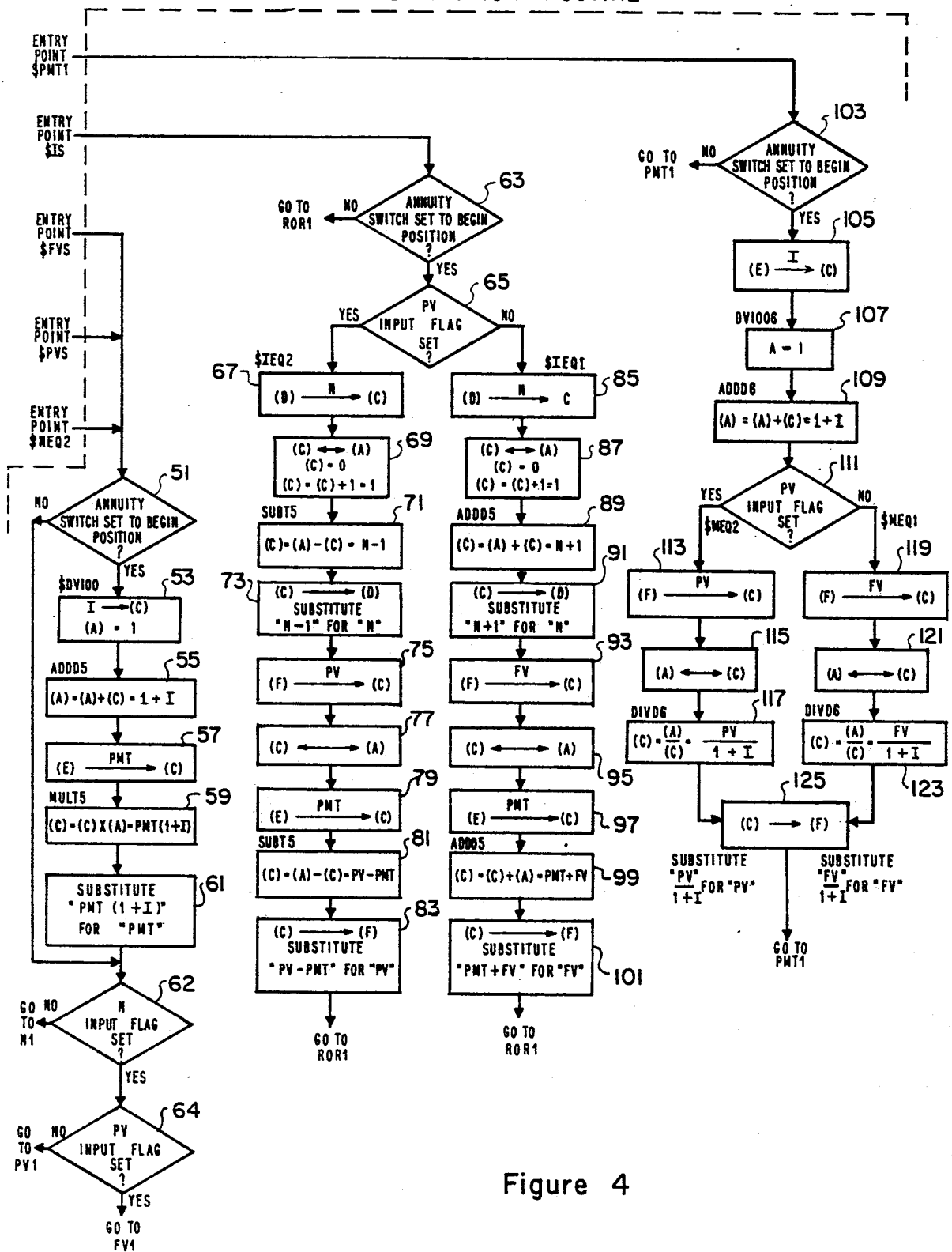
FIG. 4 is a logic flow diagram of a data substitution routine stored in a read-only-memory of the begin-end annuity calculation logic of FIG. 3.

The data substitution operation performed under the control of the data substitution routine is disclosed in the logic flow diagram of FIG. 4. A list of the instructions of which this routine is comprised is shown in Table 2 below.

The instructions in Table 2 are provided with numbers corresponding to the blocks of the logic flow diagram of FIG. 4. The operations shown in the blocks represent the instructions of the table in simplified form. Hereinafter, execution of the blocks in FIG. 4 means execution of the operations shown in those blocks.

In performing an annuity calculation, the user sets switch 25 to the "begin" or "end" position. If the switch 25 is set to the begin position, an internal sense switch (identified in Table 2 as "S switch 3") is set to zero. If switch 25 is set to the end position, the internal sense switch is set to one. Entered data (such as data values for the parameters or variables $n$, $i$ and PMT, in terms of which an unknown variable such as PV is to be solved-for) are stored in registers D, E and F 33–37. Also, when data is entered for a variable, an internal "input flag" is set signifying that data has been entered for that variable. For example, when data is entered for the variable PV, a "PV input flag" designated as C(XS) is set to one.

As FIG. 4 and Table 2 shows, when the operator presses the "$n$" key in order to have the calculator 11 solve for $n$, control is transferred to location $NEQ2 of the data substitution routine, and block 51 is executed. At block 51 a test is made to determine the setting of switch 25. If sense switch 3 equals one indicating that switch 25 is set to the end position, control is transferred to block 62. At block 62, a test is made to determine the variable being solved-for. If the "N input flag" is found to be not set, indicating that no data was entered for $n$ and that $n$ was to be solved-for, control is transferred to location N1 of the annuity calculation routine shown starting at step numbered 30 in columns 31 and 32 of the above-referenced patent; in which event, the value for $n$ is calculated with no substitutions made. However, if switch 3 equals zero indicating that switch 25 is set to the begin position, control is transferred from block 51 to block 53.

At block 53, the value I (previously stored in register D when entered) is transferred to the C register, and a value of one is stored in the A register. Following this, at block 55, the contents of the A and C registers are summed and the result $(1 + I)$ is stored in the A register. Thereafter, at block 57, the value of PMT (previously stored in register E when entered) is transferred to the C register and, as block 59 shows, this value is multiplied by the contents of the A register to produce the result "PMT $(1 + I)$", which result is then stored in the C register. As shown at block 61, this result in the C register is then transferred to register E replacing the value "PMT" in register E. Thereafter, control is transferred to block 62 where a test is made to determine the variable being solved-for. If at block 62 the N input flag is found to be not set, this indicates that $n$ is the variable being solved-for and control is transferred to location N1 of the annuity calculation routine (see step 30 in columns 31 and 32 of the above-referenced patent) which enables the annuity calculation routine to perform the desired annuity calculation using the substituted value "PMT $(1 + I)$" in register E instead of the "PMT" value previously stored in register E.

When the operator presses the PV or FV key, control is transferred to locations $PVS and $FVS, respectively. From these locations, control is transferred to block 51 as when solving for $n$. From block 51, control is transferred to block 62 when switch 25 is set to the "end" position (in which case no data substitutions are performed), and to block 53 when switch 25 is set to the "begin" position. From block 53, control is transferred to block 61 via blocks 55, 57 and 59, resulting in the value "PMT $(1 + I)$" being substituted for the value "PMT". From block 61, control is transferred to block 62. At blocks 62 and 64, tests are made to determine the variables being solved-for. At block 62, if the N input flag is found to be not set, indicating that $n$ is the variable being solved-for, control is transferred to location N1 of the annuity calculation routine, otherwise control is transferred to block 64. At block 64, a further test is made to determine which of PV or FV is the variable being solved-for. If at block 64 the PV input flag is found to be not set, indicating that PV is the variable being solved-for, control is transferred to location PV1 (step 26) of the annuity calculation routine in the above-referenced patent. Otherwise, if at block 64 the PV input flag is found to be set, indicating that FV is the variable being solved-for, control is transferred to location FV1 (step 24) of the annuity calculation routine.

When the operator presses the "$i$" key to have the calculator 11 solve for "$i$", control is transferred to location $IS of the data substitution routine, and block 63 is executed. At block 63, a test is made to determine the setting of switch 25. If sense switch 3 equals one, indicating that switch 25 is set to the end position, control is transferred to location ROR1 of the annuity calculation routine (shown starting at step numbered 28 in columns 31 and 32 of the above-referenced patent); in which event, the value $i$ is calculated with no substitutions made. However, if sense switch 3 equals zero indicating that switch 25 is set to the begin position, control is tranferred from block 63 to block 65. At block 65, a test is made to determine the parameters ("$n$, PMT and PV" or "$n$, PMT and FV") in terms of which "$i$" is to be solved-for. If the PV input flag is set (i.e., C(XS) = 1), control is transferred to block 67 corresponding to location $IEQ2 of the data substitution routine. If the PV input flag is not set (i.e., C(XS) = 0 indicating that $i$ is to be solved-for in terms of FV, control is transferred to block 85 corresponding to location $IEQ1 of the data substitution routine.

At blocks 67 and 69, the value for N (previously entered and stored in register D) is transferred first to register C then to register A, and the value "1" is placed in register C. Thereafter, as block 71 shows, the contents of register C is subtracted from the contents of register A to produce the value "N-1" in register C. At block 73, this value "N-1" is then substituted for the value N in register D. Block 75 shows the start of another substitution operation, viz, the substitution of the quantity "PV-PMT" for PV. As blocks 75 and 77 show, the value for PV (previously entered and stored in register F) is transferred first to register C then to register A. The value for PMT (previously entered and stored in register E) is then transferred to register C, as shown by block 79, after which, the contents of register C is subtracted from the contents of register A to produce the value "PV-PMT" in register C, as shown by block 81. This value "PV-PMT" is then substituted for the value "PV" in register F, as shown by block 83, after which control is transferred to location ROR1 of the annuity calculation routine (identified as step numbered 28 in columns 31 and 32 of the above-referenced patent).

Blocks 85-101 are executed when solving for $i$ in terms of FV as one of the input parameters. Thus, when the PV flag is not set (indicating that no data value was input for PV, and $i$ should be solved-for in terms of FV), control is transferred to block 85. At blocks 85 and 87, the value for N (previously entered and stored in register D) is transferred first to register C then to register A, and the value "1" is placed in register C. Thereafter, as block 89 shows, the contents of registers A and C are added to produce the value "N + 1" in register C. At block 91, this value "N + 1" is then substituted for the value N in register D. Following the substitution operation at block 91, the additional substitution operation of "PMT + FV" for "FV" is then commenced at block 93. As blocks 93 and 95 show, the value for FV (previously entered and stored in register F) is transferred first to register C then to register A. The value for PMT (previously entered and stored in register E) is then transferred to register C, as block 97 shows, after which, the contents of registers A and C are added to produce the value "PMT + FV" in register C, as shown by block 99. This value "PMT + FV" is then substituted for the value "FV" in register F, as shown by block 101, after which control is transferred to location ROR1 of the annuity calculation routine.

When the user presses the PMT key to have the calculator 11 solve for the variable "PMT", control is transferred to location $PMT in the data substitution routine, stating a block 103. At block 103, the setting of the annuity switch 25 is tested for. If the switch 25 is set to the end position, control is transferred to location PMT1 in the annuity calculation routine and the annuity calculation proceeds as described in the above-referenced patent without any substitutions by the data substitution routine. (Location PMT1 is identified as step number 27 in columns 31 and 32 of the above-referenced patent.) If switch 25 is set to the begin position, control is transferred from block 103 to block 105. At block 105, the value for I (previously entered and stored in register F) is transferred to register C. Thereafter at block 107, the contents of the A register is set to one. Following this operation, the contents of the A and C registers are added to produce the value "1 + I", which value is stored in the A register as shown in block 109. After the operation at block 109 is performed, control is transferred to block 113 via block 111 if the PV input flag is set indicating that a data value has been input for the variable PV and that PV is one of the variables in terms of which the value of PMT is to be determined. At block 113, the input data value for the variable PV is transferred from register F, where it is stored after initial entry, to register C. At block 115, the value "1 + I" previously stored in the A register as the result of the operation at block 109 is transferred to the C register, and the value of PV in the C register is transferred to the A register. Thereafter, as block 117 shows, the contents of the A register is divided by the contents of the C register to produce the value $$\text{``} \frac{PV}{1+I} \text{''}$$

in the C register. In the event the PV input flag was found not set at block 111, indicating that the variable PMT is to be solved-for in terms of FV rather than PV, the operations at blocks 119, 121 and 123 would be performed in similar manner as blocks 113, 115, 117, resulting in the value $$\text{``} \frac{FV}{1+I} \text{''}$$

being stored in register C. After the operation at block 117 or at block 123 is performed, control is transferred to block 125 which substitutes the value $$\text{``} \frac{PV}{1+I} \text{''}$$

for "PV" when PMT is being solved-for in terms of PV, or substitutes the value $$\text{``} \frac{FV}{1+I} \text{''}$$

for "FV" when PMT is being solved-for in terms of FV. Following the operation at block 125, control is transferred to location PMT1 of the annuity calculating routine, which routine uses the substituted data to accurately calculate the PMT value when the annuity switch 25 is set to the begin position indicating that payments are due at the beginning of each payment period.

TABLE 2

| Step Number | ROM Address | Flow Chart Block Number | Label | Program Instructions | Remarks |
| --- | --- | --- | --- | --- | --- |
| 1 | 2001 | 51 | $NEQ2 | IF O = S Switch 3 | If in annutiy due |
| 2 | 2002 | | | Then go to NSUB2 | Mode change inputs |
| 3 | 2003 | | | Go to XXIT | |
| 4 | 2004 | 53 | NSUB2 | JSB $DV100 | C = I A = 1 |
| 5 | 2005 | 55 | | JSB ADDDS | |
| 6 | 2006 | 57 | | Register -> C 12 | Get PMT in C |
| 7 | 2007 | 59 | | JSB MULT5 | PMT (1 + I) |
| 8 | 2010 | 61 | NSUB21 | C -> register 15 | Modified param in reg |
| 9 | 2011 | 62 | XXIT | If O = NF | |
| 10 | 2012 | | | Then go to N1 | |
| 11 | 2013 | 64 | | IF O = PVF | |
| 12 | 2014 | | | Then go to PV1 | |
| 13 | 2015 | | | Go to FV1 | |
| 14 | 2016 | | $PVS | Go to $NEQ2 | |
| 15 | 2017 | | $FVS | Go to $NEQ2 | |
| 16 | 2020 | 63 | $IS | If O = S Switch 3 | |
| 17 | 2021 | | | Then go to ISUB2 | For annuity due substitutions |
| 18 | 2022 | | | Go to OR1 | |
| 19 | 2023 | 65 | ISUB2 | If O = PVF | |
| 20 | 2024 | | | Then go to $IEQ1 | |
| 21 | 2025 | 67 | $IEQ2 | Register -> C 10 | N -> (C) |

TABLE 2-continued

| Step Number | ROM Address | Flow Chart Block Number | Label | Program Instructions | Remarks |
|---|---|---|---|---|---|
| 22 | 2026 | 69 | | A exchange C<N> | N IN A |
| 23 | 2027 | | | 0 -> C<N> | |
| 24 | 2030 | | | C + 1 -> C<P> | C = 1 |
| 25 | 2031 | 71 | | JSB SUBT5 | N-1 |
| 26 | 2032 | 73 | | C -> Register 9 | |
| 27 | 2033 | 75 | | Register -> C 13 | PV |
| 28 | 2034 | 77 | | A exchange C<N> | PV IN A |
| 29 | 2035 | 79 | | Register -> C 12 | PMT |
| 30 | 2036 | 81 | | JSB SUBT5 | PV - PMT |
| 31 | 2037 | 83 | ISUB21 | C -< register 15 | IN REG |
| 32 | 2040 | | | Go to ROR1 | |
| 33 | 2041 | 85 | $IEQ1 | Register -< C 10 | N -> (C) |
| 34 | 2042 | 87 | | A exchange C<N> | N IN A |
| 35 | 2043 | | | 0 -> C<N> | |
| 36 | 2044 | | | C + 1 -> C<P> | C = 1 |
| 37 | 2045 | 89 | | JSB ADDD5 | N + 1 |
| 38 | 2046 | 91 | | C -> register 9 | |
| 39 | 2047 | 93 | | Register -> C 14 | FV |
| 40 | 2050 | 95 | | A exchange C>N> | FV IN A |
| 41 | 2051 | 97 | | Register -> C 12 | PMT |
| 42 | 2052 | 99 | | JSB ADDD5 | PMT + FV |
| 43 | 2053 | 101 | ISUB41 | C -> register 15 | IN REG |
| 44 | 2054 | | | Go to ROR1 | |
| 45 | 2055 | 103 | $PMT | If 0 = S switch 3 | |
| 46 | 2056 | | | Then go to MSUB4 | annuity due substitutions |
| 47 | 2057 | | | Go to PMT1 | |
| 48 | 2060 | 105 | MSUB4 | Register -> C 11 | C = I |
| 49 | 2061 | 107 | | JSB DV1006 | A = 1 |
| 50 | 2062 | 109 | | JSB ADDD6 | 1 + I |
| 51 | 2063 | 111 | | IF O = PVF | |
| 52 | 2064 | | | Then go to $MEQ1 | |
| 53 | 2065 | 113 | $MEQ2 | Register -> C 13 | C = PV |
| 54 | 2066 | 115 | | A exchange C<N> | C = 1+I A = PV |
| 55 | 2067 | 117 | | JSB DIVD6 | PV/(1+I) |
| 56 | 2070 | 125 | STR | C -> Register 15 | Modified param in reg |
| 57 | 2071 | | | Go to PMT1 | |
| 58 | 2072 | 119 | $MEQ1 | Register -> C 14 | C = FV |
| 59 | 2073 | 121 | | A exchange C<N> | A = FV, C = 1 + I |
| 60 | 2074 | 123 | | JSB DIVD6 | FV/(1+I) |
| 61 | 2075 | | | Go to STR | |

We claim:

1. An apparatus for performing annuity calculations with payments due at one of the beginning and end of each payment period, said apparatus comprising:
switch means manually settable to one of a first and second positions; and
processing means coupled to said switch means and coupled to receive input data for performing selected annuity calculations with payment due at one of the beginning and end of each payment period, calculations with payment due at the beginning of each payment period being performed by automatically converting the input data to produce substitute data and mathematically manipulating the substitute data in response to the switch means being set to the first position, and calculations with payment due at the end of each payment period being performed by mathematically manipulating the input data in response to the switch means being set to the second position.

2. The apparatus of claim 1 wherein the first position of said switch means is a begin position and the second position is an end position.

3. The apparatus of claim 1 wherein said processing means includes a switch register means for receiving and storing switch-position information and includes a begin-end annuity calculation logic.

4. The apparatus of claim 3 wherein said begin-end annuity calculation logic includes at least one data register means for receiving and storing the input data, an adder unit, and a memory means, said memory means being coupled to said switch and data registers and to said adder, and having a routine stored therein for converting the input data to substitute data and for mathematically manipulating the substitute data and the input data.

* * * * *

UNITED STATES PATENT AND TRADEMARK OFFICE
CERTIFICATE OF CORRECTION

PATENT NO. : 4,055,757

DATED : 10/25/77

INVENTOR(S) : Lynn W. Tillman, Kent R. Henscheid, Larry D. Smith

It is certified that error appears in the above-identified patent and that said Letters Patent are hereby corrected as shown below:

Column 7, Table 2, Step Number 31, under Program Instructions, "C - < register 15" should read, --C -> register 15 --;

Column 7, Table 2, Step Number 33, under Program Instructions, "Register - < C 10" should read -- Register -> C 10--;

Column 7, Table 2, Step Number 40, under Program Instructions, "A exchange C > N >" should read --A exchange C<N>--.

Signed and Sealed this

Seventh Day of March 1978

[SEAL]

Attest:

RUTH C. MASON
Attesting Officer

LUTRELLE F. PARKER
Acting Commissioner of Patents and Trademarks